(12) United States Patent
Heinemann et al.

(10) Patent No.: US 10,081,884 B2
(45) Date of Patent: Sep. 25, 2018

(54) METHOD OF PRODUCING A FILAMENT COMPRISING A SILICA GEL-FIBER

(71) Applicant: BAYER INNOVATION GMBH, Leverkusen (DE)

(72) Inventors: Maren Heinemann, Bergisch Gladbach (DE); Arne Braun, Leverkusen (DE); Thomas Konig, Leverkusen (DE); Karl-Robert Boos, Burscheid (DE); Lars Lachmann, Berlin (DE)

(73) Assignee: BAYER INTELLECTUAL PROPERTY GMBH, Monheim am Rhein (DE)

( * ) Notice: Subject to any disclaimer, the term of this patent is extended or adjusted under 35 U.S.C. 154(b) by 0 days.

(21) Appl. No.: 15/437,753

(22) Filed: Feb. 21, 2017

(65) Prior Publication Data

US 2017/0167052 A1   Jun. 15, 2017

Related U.S. Application Data

(62) Division of application No. 13/699,668, filed as application No. PCT/EP2011/058504 on May 24, 2011.

(30) Foreign Application Priority Data

May 26, 2010  (DE) .................. 10 2010 021 636

(51) Int. Cl.
| | | |
|---|---|---|
| *D01D 5/06* | (2006.01) | |
| *D01D 4/02* | (2006.01) | |
| *D01F 9/08* | (2006.01) | |
| *B29C 47/00* | (2006.01) | |
| *B29C 47/30* | (2006.01) | |
| *B29K 83/00* | (2006.01) | |
| *C01B 33/157* | (2006.01) | |
| *C01B 33/14* | (2006.01) | |

(52) U.S. Cl.
CPC ........... *D01D 5/06* (2013.01); *B29C 47/0004* (2013.01); *B29C 47/0014* (2013.01); *B29C 47/30* (2013.01); *D01D 4/027* (2013.01); *D01F 9/08* (2013.01); *B29K 2083/00* (2013.01); *C01B 33/14* (2013.01); *C01B 33/157* (2013.01)

(58) Field of Classification Search
None
See application file for complete search history.

(56) References Cited

U.S. PATENT DOCUMENTS

| | | |
|---|---|---|
| 4,724,109 A | 2/1988 | Yamashita et al. |
| 6,116,883 A | 9/2000 | Takeuchi et al. |
| 2009/0221206 A1 | 9/2009 | Gerking |

(Continued)

FOREIGN PATENT DOCUMENTS

| | | |
|---|---|---|
| DE | 2324599 A1 | 12/1974 |
| DE | 19609551 C1 | 7/1997 |
| DE | 102004063599 A1 | 7/2006 |

(Continued)

OTHER PUBLICATIONS

International Search Report of International Patent Application No. PCT/EP2011/058504 dated Sep. 19, 2011.

*Primary Examiner* — Benjamin A Schiffman
(74) *Attorney, Agent, or Firm* — McBee Moore Woodward & Vanik IP, LLC

(57) ABSTRACT

The present invention provides a nozzle plate and the use of the nozzle plate for producing filaments, preferably silica gel fibers.

13 Claims, 3 Drawing Sheets

(56) References Cited

U.S. PATENT DOCUMENTS

2010/0022932 A1    1/2010   Thierauf et al.

FOREIGN PATENT DOCUMENTS

| EP | 0392466 A2 | 10/1990 |
|---|---|---|
| GB | 1126609 A | 9/1968 |
| JP | S-60139819 A | 7/1985 |
| JP | S-62-110919 A | 5/1987 |
| JP | S-62125007 A | 6/1987 |
| JP | 1153552 A | 6/1989 |
| JP | H-01153552 A | 6/1989 |
| JP | H-02-275729 A | 11/1990 |
| RU | 2201945 C2 | 4/2003 |
| WO | 03104535 A1 | 12/2003 |

METHOD OF PRODUCING A FILAMENT COMPRISING A SILICA GEL-FIBER

CROSS REFERENCE TO RELATED APPLICATIONS

This application is a Divisional application of the Non-Provisional application Ser. No. 13/699,668, filed on Feb. 15, 2013, which is a national stage application of PCT/EP2011/058504 filed on May 24, 2011, which claims priority to German Application No. 102010021636.4, filed on May 26, 2010. The present application claims priorities to all these prior applications and incorporates these prior applications by reference in their entirety.

BACKGROUND OF THE INVENTION

Field of the Invention

The present invention provides a nozzle plate and use of the nozzle plate for producing continuous filaments, preferably silica gel fibers.

Description of Related Art

Patent DE19609551C1 and published patent application DE102004063599A1 disclose a method for producing silica gel fibers. The method comprises a plurality of steps. In a first step, a spinning composition is produced which, in a second step, is pressed from a pressure vessel through nozzles, where it emerges in the form of filaments. Depending on the size of the nozzles, the filaments have a diameter of approx. 10 to 100 μm.

Published patent application DE102004063599A1 discloses details regarding the nozzles through which the spinning composition is pressed. A 7- or 19-hole nozzle plate is used. The drill bore leading up to a hole is 3.0 mm wide and the hole diameter D amounts to 0.15 mm. At a capillary length L of 0.45 mm, an L/D ratio of 3 is obtained. FIG. 2 of the published patent application shows a schematic diagram of the nozzle plate and an individual hole-type nozzle in cross-section.

This nozzle plate described in the prior art exhibits disadvantages. At the start of a pressing operation of the spinning composition through a nozzle as disclosed in DE102004063599A1, the emerging spinning composition wets the planar zone around the nozzle orifice. Spinning composition collects around the orifice until, under the effect of gravity, it gradually becomes detached from the nozzle orifice and falls to the ground in the form of a drop which takes a spun filament with it.

The individual nozzles here exhibit a different behavior over time. There are individual nozzles from which a filament immediately emerges, the thickness of which is, however, initially nonuniform, since some of the emerging spinning composition sticks behind on the region around the nozzle orifice and, apart from a thin film, only becomes detached from the nozzle plate after varying lengths of time. There are individual nozzles for which the filament breaks off and only forms a new uniform filament once a certain amount of time has elapsed. In addition to the nonuniformity, the spinning composition located in the region around the nozzle orifice may impair filament formation during the entire spinning procedure if said spinning composition only becomes very incompletely detached from the nozzle plate and the composition which is left behind comes into contact with the filament. This may give rise to disruption of filament formation and movement which may go as far as a plurality of filaments becoming tangled or the periodic formation of drops.

These problems result, for example, in its being necessary to discard the filaments which initially emerge from the nozzles due to their nonuniformity. If the method for producing filaments is interrupted, uniform filaments can only be produced again after a significant startup time and elaborate cleaning of the nozzle plate. It is here very often observed that spun material, which inevitably remains behind as a thin film around the nozzle opening after detachment of the spinning composition from the nozzle plate, leads to spinning composition only becoming very incompletely detached from the nozzle plate when the spinning operation is restarted, such that the nozzle plate must first be cleaned before it can be used again.

On the basis of the described prior art, a person skilled in the art is therefore faced with the problem of finding a solution to the adhesion of spinning composition at the nozzle orifices and the concomitant initial formation of nonuniform filaments. The solution is in particular intended to be suitable for the production of silica gel fibers.

SUMMARY

According to the invention, said problem is solved by a nozzle plate as claimed in claim 1. Preferred embodiments are stated in the dependent claims.

The present invention accordingly provides a nozzle plate comprising at least one nozzle with a nozzle opening, wherein the nozzle opening has a cross-sectional area of size A1, wherein a tear-off edge with an angle β in the range from 5° to 90° extends around the nozzle opening, wherein the area which immediately adjoins the nozzle opening outside the nozzle and extends around the nozzle opening has an area of size A2, characterized in that the ratio A2/A1 is less than 20.

DETAILED DESCRIPTION OF A PREFERRED EMBODIMENT

A composition is pressed outwards out of the nozzle through the nozzle opening. The size of the nozzle opening determines the thickness of the strand emerging outwards out of the nozzle. The nozzle opening has a cross-sectional area of size A1.

The spinning composition may be pressed through the spinning nozzle in various ways. In the prior art, a pressure vessel, which is pressurized with gas, is conventionally used. It is likewise possible to press the spinning composition through the nozzle plate with a suitable pump. Depending on the field of application, a plurality of pumps are suitable for this purpose, such as for example piston pumps, gear pumps, eccentric pumps and screw pumps. Gear pumps are preferably used. It is likewise possible to press the spinning composition through the nozzles from a cylindrical container by means of a piston.

The spinning composition emerging outwards through a nozzle opening should wet the region around the nozzle opening as little as possible, since an uncontrollable accumulation of material otherwise occurs around the nozzle opening. In particular at the start, this accumulation results in nonuniform filament formation.

A tear-off edge is therefore located around the nozzle opening and the area outside the nozzle opening which extends around the nozzle opening is kept as small as possible.

Figure 3:
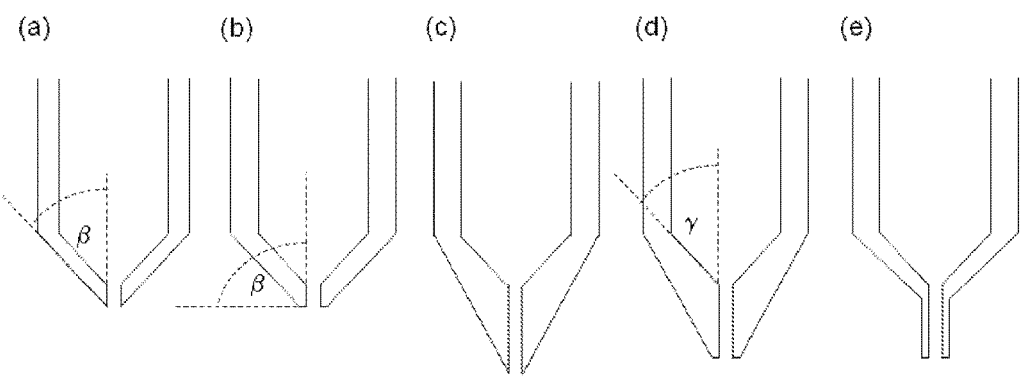
Figure 5:
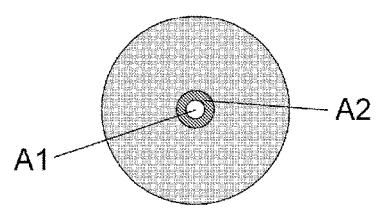

A tear-off edge with a minimum area of the orifice region may in principle be achieved in that the nozzle takes the form of a channel which extends perpendicularly through the tip of a straight cone (see for example FIG. 3(a)). However, since for manufacturing reasons there is always a ring with a finite width around such an opening, the ratio A2/A1 cannot be minimized at will. This is illustrated by FIGS. 3(b) and 5. The lower part of FIG. 3(b) shows a nozzle in cross-section, in which a ring with a finite width extends around the nozzle opening. FIG. 5 shows a plan view from below of the same nozzle. The nozzle opening has a cross-sectional area of size A1 while the ring has an area of size A2. According to the invention, the ratio A2/A1 is less than 20.

The ratio A2/A1 is preferably less than 15, particularly preferably less than 10, very particularly preferably less than 5 and most preferably less than 1.

The angle β of the tear-off edge is preferably in the range from 10° to 90°, particularly preferably in the range from 20° to 90°, very particularly preferably in the range from 30° to 90°.

The nozzle plate according to the invention preferably comprises a plurality of identical nozzles with the above-described features. The number of nozzles is for example in the range from 1 to 1000, more preferably from 4 to 100.

The nozzles may be produced by drilling and/or milling operations in the nozzle plate. The nozzle plate is preferably of modular construction. This means that the nozzle plate has openings into which nozzle inserts may be inserted. It is for example conceivable to shrink-fit or screw the nozzle inserts into the nozzle plate.

The nozzle plate according to the invention is suitable for producing filaments, in particular silica gel fibers, in particular in a dry spinning process as is disclosed by way of example in DE19609551C1 and DE102004063599A1. The present invention accordingly also provides the use of the nozzle plate according to the invention for producing silica gel fibers.

Preferred embodiments of the nozzle plate according to the invention are described in greater detail below, but without limiting the invention to these examples. The nozzle openings shown have a round cross-section. A round cross-section is always preferred, but it is however also conceivable to make the cross-section in any other conceivable shape, in particular oval. It is likewise conceivable to combine features of individual illustrated embodiments to create further embodiments according to the invention which are not shown.

Figure 1:
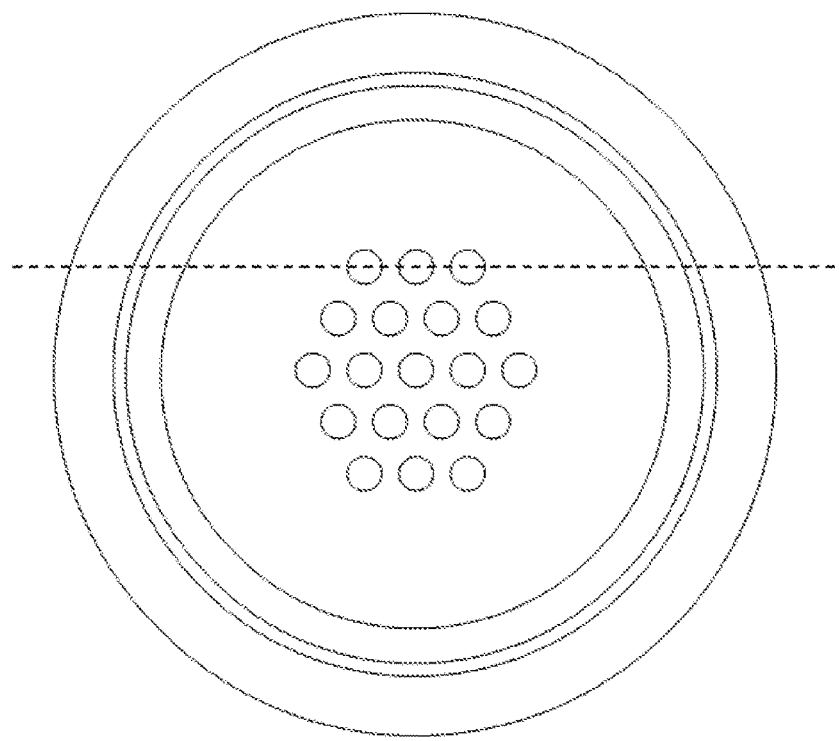
FIGS. 1-7 represent embodiments of the invention described herein.

FIG. 1 is a schematic diagram of a preferred embodiment of a nozzle plate according to the invention in plan view. The nozzle plate is round and has 19 nozzles.

Figure 2:
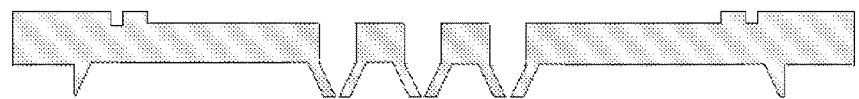

FIG. 2 is a schematic diagram of the nozzle plate from FIG. 1 in cross-section along the dashed line. The individual nozzles in each case comprise a channel which tapers conically downwards.

FIGS. 3(a) to (e) are schematic diagrams of various embodiments of nozzles. In FIG. 1(a), the nozzle opening is formed by a channel which extends through the tip of a straight cone. In this way, a sharp tear-off edge is formed around the nozzle opening. The angle β between the conically tapering cone envelope and the vertical through the nozzle opening is in the range from 10° to 80°, preferably in the range from 20° to 70° and particularly preferably in the range from 30° to 60°.

In FIG. 3(b), the angle β of the tear-off edge is 90°. Around the nozzle opening there is a ring which is of the smallest possible width so that the least possible wetting occurs.

In the nozzles of FIGS. 3(c) to 3(e), the cylindrical region of the nozzle channel has been lengthened in comparison with the embodiments of FIGS. 3(a) and 3(b). This results in a larger L/D ratio. The L/D ratio of the cylindrical region is in the range from 0.5 to 10, preferably in the range from 1 to 5, particularly preferably in the range from 1.5 to 3.

In FIGS. 3(b), (d) and (e), the areas A1 and A2 extend parallel to one another. It is, however, also conceivable for the area A2 to extend at an angle to area A1. This is shown by way of example in FIG. 4(a). The angle ω is preferably in the range from 0° to 80°, particularly preferably in the range from 0° to 60°.

Figure 4:
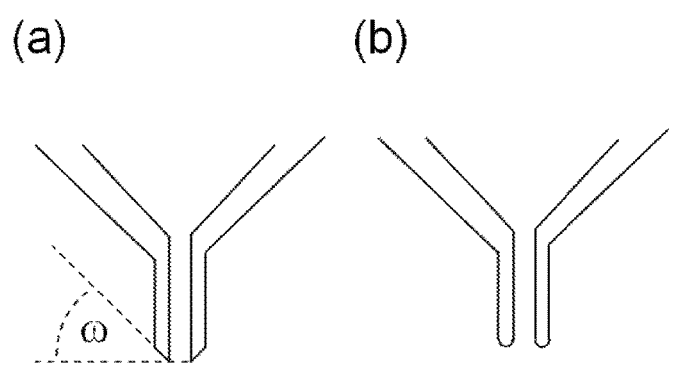

It is also conceivable for the area A2 to be curved, as shown by way of example in FIG. 4(b). It is, however, important for there to be an edge extending around the nozzle opening which acts as a tear-off edge for the filaments emerging from the nozzle opening. As illustrated by the example of the embodiment of FIG. 3(a), this edge is characterized by the angle β.

If the angle β amounts to 90°, the areas A1 and A2 extend parallel to one another and wetting of the area A2 is minimized according to the invention in that the ratio A2/A1 is less than 20, preferably less than 15, particularly preferably less than 10, very particularly preferably less than 5 and most preferably less than 1.

FIG. 5 is a schematic diagram of a nozzle according to FIGS. 3(b), 3(d), 3(e), 4(a) and 4(b) in plan view from below.

Figure 6:
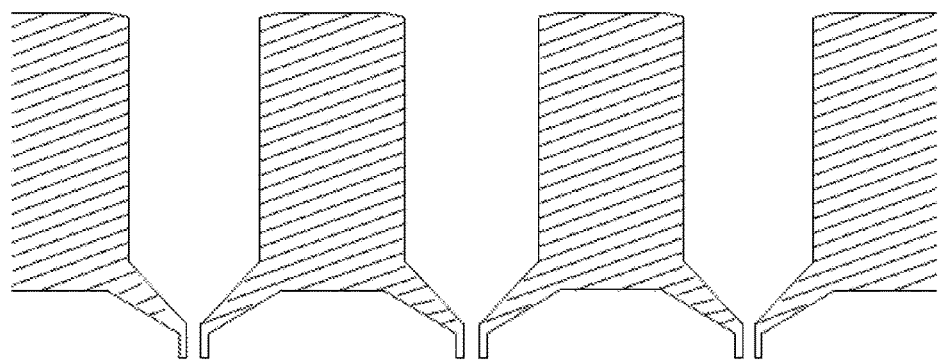

FIG. 6 shows an enlarged portion of the nozzle plate according to the invention from FIGS. 1 and 2 in cross-section through the nozzles.

Figure 7:
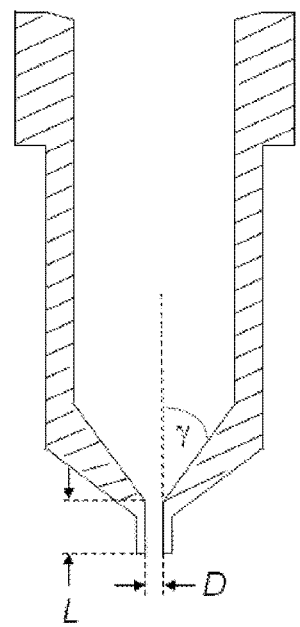

FIG. 7 shows a preferred embodiment of an individual nozzle which takes the form of a modular insert which may be inserted into a corresponding passage through a plate. The nozzle insert comprises a vertically extending channel. In the figure shown, the channel would be supplied from above with spinning composition, which would then leave from the lower region of the channel under pressure. The shape of the channel is initially cylindrical in the direction of flow, then tapers conically with an angle γ to the vertical in the range from 10° to 80°, preferably in the range from 20° to 70°, particularly preferably in the range from 30° to 60°, until the diameter D of the channel cross-section is reduced to a size in the range from 0.05 mm to 0.5 mm, preferably in the range from 0.1 to 0.3 mm, particularly preferably in the range from 0.12 to 0.18. The conical region of the channel is followed by a cylindrical region of length L. The same preferred L/D ratios as were discussed in the example relating to FIG. 3 apply to the embodiment shown in FIG. 7.

The invention claimed is:

1. A method of producing a filament comprising a silica gel fiber, comprising:
   pressing a spinning composition containing the silica gel fiber through a nozzle plate comprising a number of nozzles in a range from 1 to 1000, each of the number of nozzles having a nozzle opening,
   wherein the nozzle opening has a cross-sectional area of size A1, wherein a tear-off edge with an angle β in a range from 5° to 90° extends around the nozzle opening, wherein an area, which immediately adjoins the nozzle opening outside the nozzle and extends around the nozzle opening, has an area of the size A2, wherein a ratio A2/A1 is not more than 1, wherein the area of size A2 extends at an angle ω to the cross-sectional area of size A1, wherein the angle ω is greater than 0° and less than 80°, wherein each nozzle takes a form of a nozzle insert, which is inserted into a corresponding opening in the nozzle plate, wherein each of the number of nozzles comprises a channel, the channel comprising a first cylindrical section extending vertically in the direction of flow, a second conical section to form a conical region, and a third cylindrical section extending vertically from the second conical section and forming a nozzle opening at an end distal from the second conical section;

wherein the conical region forms an angle γ with the third cylindrical section in the range of 10° to 80° wherein the third cylindrical section has a length L and a diameter D;

wherein the following applies to a ratio L/D: $0.5 \leq L/D \leq 10$; and, wherein the entire conical region is disposed outside the plate.

2. The method of claim 1, wherein the angle β of the tear-off edge is in a range from 10° to 90°.

3. The method of claim 1, wherein the angle β of the tear-off edge is in a range from 20° to 90°.

4. The method of claim 1, wherein the angle β of the tear-off edge is in a range from 30° to 90°.

5. The method of claim 1, wherein the angle γ to the vertical in the range from 20° to 70°.

6. The method of claim 1, wherein the angle γ to the vertical in the range from 30° to 60°.

7. The method of claim 1, wherein the ratio L/D is in a range from 1 to 5.

8. The method of claim 1, wherein the ratio L/D is in a range from 1.5 to 3.

9. The method of claim 1, wherein the diameter D is 0.05 mm to 0.5 mm.

10. The method of claim 1, wherein the diameter D is 0.1 mm to 0.3 mm.

11. The method of claim 1, wherein the diameter D is 0.12 mm to 0.18 mm.

12. The method of claim 1, wherein the cylinder adjoining the nozzle opening is disposed outside the plate.

13. The method of claim 1, wherein the nozzle plate has a number of nozzles in a range from 4 to 100.

* * * * *